United States Patent Office 3,558,601
Patented Jan. 26, 1971

3,558,601
PENICILLINS AND THEIR PREPARATION
Bertil Åke Ekström and Olof Harald Sjöberg, Sodertalje, Sweden, assignors to Aktiebolaget Astra, Sodertalje, Sweden, a company of Sweden
No Drawing. Filed Dec. 4, 1967, Ser. No. 687,423
Claims priority, application Great Britain, Dec. 28, 1966, 57,987/66; Mar. 29, 1967, 14,332/67
Int. Cl. C07d 99/16
U.S. Cl. 260—239.1                13 Claims

ABSTRACT OF THE DISCLOSURE

A new class of penicillins in which the side chain contains a phosphinylamino or phosphinothiolylamino group. The compounds are antimicrobially active. Methods of synthesis are described.

The present invention relates to antimicrobially active compounds and their preparation. Particularly it concerns penicillins containing a phosphinylamino or phosphinothiolylamino group in the side chain. The compounds prepared according to the present invention have properties which make them valuable as antibacterial agents, as nutritional supplements in animals feeds, as agents for treatment of mastitis in cattle and as therapeutic agents in poultry and animals, including man, in the treatment of infectious diseases caused by microorganisms.

The compounds of the present invention have the general formula:

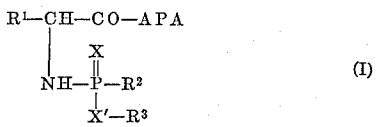
(I)

where APA is the residue

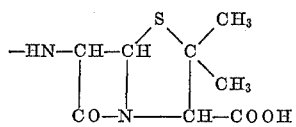

R' is selected from the class consisting of hydrogen, alkyl of at most 5 carbon atoms, aralkyl of at most 10 carbon atoms, monocyclic and bicyclic aryl and monocyclic and bicyclic heterocylic groups and $R^2$ is $R^4$ or $OR^4$, wherein $R^4$ is selected from the group consisting of hydrogen, alkyl of at most 5 carbon atoms, aralkyl of at most 10 carbon atoms, monocyclic and bicyclic aryl and monocyclic heterocyclic groups, $R^3$ is selected from the class consisting of hydrogen, alkyl of at most 5 carbon atoms, aralkyl of at most 10 carbon atoms, monocyclic and bicyclic aryl and monocyclic heterocyclic groups, which substituents $R^1$, $R^3$ and $R^4$ all may be unsubstituted or substituted with at least one member of the class consisting of alkyl of at most 3 carbon atoms, alkoxy of at most 3 carbon atoms, nitro, halogen and methylmercapto, and $R^3$ and $R^4$ may be connected and internally form a ring; X and $X^1$ are selected from O and S, at least one of X and $X^1$ being O.

Illustrative examples of compounds of the present invention are:

Bisethoxyphosphinylamino-methylpenicillin,
α-bismethoxyphosphinothiolylamino-ethylpenicillin,
α-bisethoxyphosphinylamino-γ-methylbutylpenicillin,
α-benzyloxymethoxyphosphinylamino-β-phenylethyl-penicillin,
α-bisethoxyphosphinothiolylamino-β-phenylethyl-penicillin,
α-hydroxymethoxyphosphinylaminoethylpenicillin,
α-ethoxyphenoxyphosphinylamino-γ-methylthiopropyl-penicillin,
6-[D-α-(methoxyphenoxyphosphinylamino)-phenyl-acetamido]penicillanic acid,
6-[D-α-(bisethoxyphosphinylamino)-phenylacetamido]penicillanic acid,
6-[D-α-(bisethoxyphosphinothiolylamino)-phenyl-acetamido]penicillanic acid,
6-[D-α-(ethoxy-ethylthiophosphinylamino)-phenyl-acetamido]penicillanic acid,
6-[D-α-(hydroxymethoxyphosphinylamino)-phenyl-acetamido]penicillanic acid,
6-[D-α-(bishydroxyphosphinylamino)-phenylacetamido]penicillanic acid,
α-hydroxymethoxyphosphinylamino-o-methoxybenzyl-penicillin,
α-benzyloxypentyloxyphosphinylamino-m-chlorobenzyl-penicillin,
α-benzyloxyethoxyphosphinylamino-3-thenylpenicillin,
α-bismethoxyphosphinothiolylamino-β-indolyl-ethylpenicillin,
bisbenzyloxyphosphinylamino-methylpenicillin,
6-[D-α-(2-oxo-1,3,2-dioxophosphinylamino)-phenylacetamido]penicillanic acid,
ethoxy ethylphosphinylamino-methylpenicillin,
α-methoxyphenylphosphinothiolylaminoethylpenicillin,
α-(methylthio)phenylphosphinylamino-β-phenylethyl-penicillin,
α-ethylhydroxyphosphinylamino-γ-methylthiopropyl-penicillin,
6-[D-α-(methoxyphenylphosphinothiolylamino)-phenyl-acetamido]penicillanic acid,
6-[D-α-(hydroxyphenylphosphinylamino)-phenyl-acetamido]penicillanic acid,
α-methoxymethylphosphinylamino-m-nitrobenzyl-penicillin,
α-methyl-p-nitrobenzyloxyphosphinylamino-benzylpenicillin,
6-[D-α-ethylphenoxyphosphinylamino-phenylacetamido]penicillanic acid,
6-[D-α-(ethoxy)-p-methoxyphosphinylamino-phenylacetamido]penicillanic acid,
6-[D-α-(ethoxy)-p-nitrophenylphosphinylamino-phenyl-acetamido]penicillanic acid,
6-[D-α-(ethoxy)-chloromethylphosphinylamino-phenylacetamido]penicillanic acid,
α-benzyloxyethylphosphinylamino-3-pyridylmethyl-penicillin,
6-[D-α-(2-thenyl)ethoxyphosphinylamino-phenyl-acetamido]penicillanic acid.

The invention also comprises non-toxic salts of compounds of the Formula I. The salts include non-toxic metallic salts, such as sodium, potassium, calcium and aluminum salts, ammonium salts and substituted ammonium salts, e.g. salts of such non-toxic amines as trialkylamines, including triethylamine, procaine, dibenzylamine, N - benzyl - β - phenethylamine, 1-ephenamine, N,N'-dibenzylethylenediamine, dehydroabiethylamine, N,N'-bis-dehydroabiethylethylene-diamine, and other amines, which have been used to form salts with benzylpenicillin or phenoxymethylpenicillin.

Compounds of the present invention may be prepared according to the following reaction schemes, which is a further aspect of the present invention:

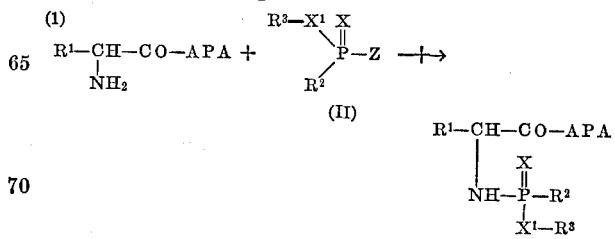

where $R^1$, $R^2$, $R^3$, X and $X^1$ have the same meaning as above and Z is an atom or a group of atoms, which can be split off together with one of the hydrogen atoms of the free amino group of the α-aminopenicillin. For instance, Z is a halogen atom, preferably chlorine, or when $R^2$ or $X^1$-$R^3$ is a hydroxy group, Z is an axido group.

(2)

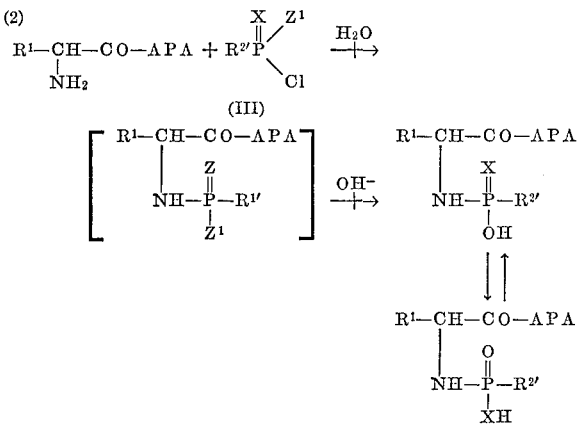

wherein $R^1$ and X have the same meaning as above, $R^{2'}$ has the same meaning as $R^2$ but not being hydrogen, and $Z^1$ is a radical which can be replaced by a hydroxy group by hydrolysis. Especially $Z^1$ is chlorine or a phenoxy group. In cases when X is S the end product may exist in tautomeric forms as a hydroxyphosphinothiolyl or as a mercaptophosphinyl compound.

(3)

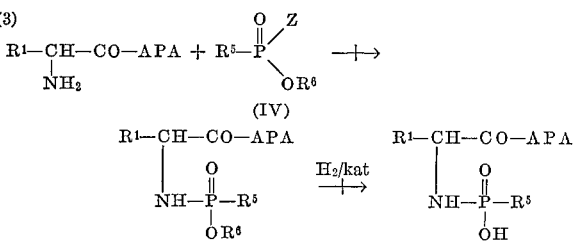

where $R^1$ and Z have the same meaning as above, $R^5$ is $R^7$ or $OR^7$, wherein $R^7$ is selected from the class consisting of alkyl of at most 5 carbon atoms, monocyclic and bicyclic aryl and monocyclic heterocyclic groups, which may be unsubstituted or substituted with at least one member of the class consisting of alkyl of at most 3 carbon atoms, alkoxy of at most 3 carbon atoms, halogen and methylmercapto, and $R^6$ is a group which can be cleaved hydrogenolytically, specially $R^6$ is a benzyl or a phenyl group.

(4)

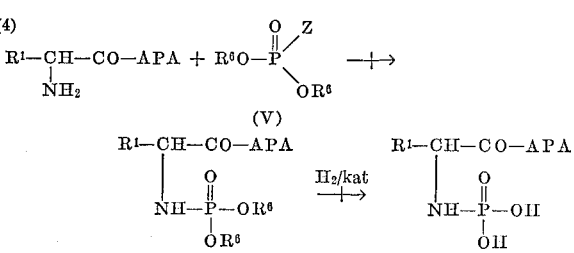

wherein $R^1$, $R^6$ and Z have the same meaning as above.

(5)

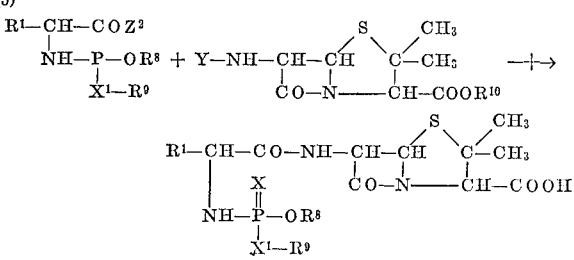

where $R^1$, X and $X^1$ are as defined above, $R^8$ and $R^9$ are the same or different and each selected from the class consisting of alkyl of at most 5 carbon atoms, aralkyl of at most 10 carbon atoms, monocyclic and bicyclic aryl and monocyclic heterocyclic groups, which may be unsubstituted or substituted with at least one member of the class consisting of alkyl of at most 3 carbon atoms, alkoxy of at most 3 carbon atoms, nitro, halogen and methylmercapto and $R^8$ and $R^9$ may be connected and internally form a ring, —$COZ^2$ is an acid chloride grouping or its functional equivalent like an acid bromide, an anhydride, especially a mixed anhydride with an alkoxyformic acid, or any other reactive acid derivative known in the art to acylate 6-aminopenicillanic acid including the acid itself in the presence of a coupling reagent such as dicyclohexylcarbodiimide and N,N'-carbonyldiimidazole, Y is hydrogen or, at the same time as $R^{10}$, is a di- or trialkylsilyl group, $R^{10}$ is selected from the class consisting of hydrogen, cation, dialkylsilyl, trialkylsilyl, trialkyltin, unsubstituted phenacyl and phenacyl substituted with one or more substituents selected from halogen atoms, alkyl, alkoxy and nitro groups and in which group $R^{10}$ each alkyl or alkoxy chain is containing at most 5 carbon atoms.

Reaction (1) is carried out in aqueous organic solution at a temperature below 50° C., preferably with ice-cooling, and at pH 5–9, preferably 7–8. The product is isolated by extraction after acidification or precipitated out.

Starting material of Formula II is illustrated by the following compounds: Bismethoxyphosphinyl chloride, bisethoxyphosphinothiolyl chloride, benzyloxymethoxyphosphinyl chloride, ethoxyethylthiophosphinyl chloride, bisphenoxyphosphinyl chloride, ethylethoxyphosphinyl chloride, ethylmethoxyphosphinothiolyl chloride, phenylbenzyloxyphosphinyl chloride, phenylbenzyloxyphosphinothiolyl chloride and sodium salt of hydroxymethoxyphosphinyl azide.

Reaction (2) is carried out in aqueous or aqueous organic solution at a temperature below 50° C., preferably with ice-cooling, and at pH 5–10, preferably 7–8. In cases when $Z^1$ is a phenoxy group after the addition of the compound of Formula III the reaction is preferably carried out at room temperature and at pH 9–11 and for 30 minutes–2 hours. The product is isolated by extraction after acidification or precipitated out.

Starting material of Formula III is illustrated by the following compounds:

Methoxyphosphinyl dichloride, phenoxyphosphinyl dichloride, phenylphosphinyl dichloride, ethylphosphinyl dichloride, methoxyphenoxyphospinyl chloride, ethylphosphinothiolyl dichloride.

Reactions (3) and (4) are carried out in aqueous or aqueous organic solution at a temperature below 50° C., preferably with ice-cooling, and at pH 5–9, preferably 7–8. The hydrogenation is performed in aqueous or organic solutions—in aqueous solution at pH 6–9, preferably 7—using precious metal catalyst (Pd/C or Pt).

Starting material of Formulas IV and V is illustrated by the following compounds:

Phenylphenoxyphosphinyl chloride, phenylbenzyloxyphosphinyl chloride, ethylbenzyloxyphosphinyl chloride, methoxybenzyloxyphosphinyl chloride and bisbenzyloxyphosphinyl chloride.

In cases when the compound of the Formula VII is 6-aminopenicillanic acid or a salt thereof with an inorganic base or an organic tertiary base, Reaction (5) is carried out, if desired or necessary with addition of base, in water or in mixtures of water and organic solvents such as acetone, methyl-isobutylketone, ether, tetrahydrofuran, dimethylformamide, N,N'-dimethylacetamide, methylene chloride, chloroform, ethylacetate, butylacetate, benzene or toluene or in dry organic solvents such as chloroform or methylene chloride at a temperature below 50° C., preferably with ice-cooling. The product is isolated by extraction after acidification.

Alternatively the compound of the Formula VII is a

N - trialkylsilylaminopenicillanic acid trialkylsilyl ester or a reaction product obtained by treatment of 6-aminopenicillanic acid with silylating reagent, capable of transferring di- or trialkylsilyl groups to the former, as described in British patent specification No. 959,853 and in Swedish patent application No. 7,167/63. In these cases the acylation reaction is performed, preferably in presence of organic tertiary bases, in dry homogenous solutions in organic solvents such as ether, tetrahydrofuran, dioxane, dimethylformamide, N,N' - dimethylacetamide, methylene chloride, chloroform, carbon tetrachloride, ethylacetate, benzene, or toluene, and at a temperature below 50° C.

As another alternative the compound of the Formula VII is a trialkyltin ester of 6-aminopenicillanic acid or a salt thereof which may be prepared according to Dutch patent application No. 6700598, and the reaction is preferably carried out in an organic solvent such as tetrahydrofuran, dimethylformamide, acetonitrile, methylene chloride or mixtures thereof, at room temperature of below, preferably between —5 and +5° C. After purification of the acylation product the ester linkage may readily be cleaved by reaction with an aromatic thiolate in non-aqueous solution, e.g. sodium or potassium thiophenoxide in dimethylformamide, or by treatment with an aqueous acid or base at room temperature or below and at a pH between 1 to 10.

As still another alternative the compound of the Formula VII is an unsubstituted or substituted phenacyl ester of 6-amino-penicillanic acid or a salt thereof, which may be prepared according to Dutch patent application 6614565, and the reaction is preferably carried out in an organic solvent such as tetrahydrofuran, dimethyl formamide, acetonitrile, methylene chloride or mixtures thereof, at room temperature or below, preferably between —5 and +5° C. After purification of the acylation product the ester linkage may readily be cleaved by reaction with an aromatic thiolate in nonaqueous solution, e.g. sodium or potassium thiophenoxide in dimethylformamide.

Starting material of Formula VI is illustrated by the following compounds:

Bisethoxyphosphinylamino - acetic acid chloride, ethoxy formic anhydride of α - bis - ethoxyphosphinylamino-propionic acid, α - bisbenzyloxyphosphinylamino - β-phenyl-propionic acid together with dicyclohexylcarbodiimide.

Starting material of Formula VII is illustrated by the following compounds:

6 - aminopenicillanic acid, 6 - aminopenicillanic acid sodium salt, 6 - aminopenicillanic acid triethylammonium salt; trimethylsilyl 6 - aminopenicillinate, trimethylsilyl N-trimethylsilyl - 6 - aminopenicillinate, and mixtures of these two compounds, triethylsilyl - 6 - aminopenicillinate, triethylsilyl N - triethylsilyl - 6 - aminopenicillinate and mixtures of these two compounds.

Phenacyl 6 - aminopenicillinate, p - bromophenacyl 6-aminopenicillinate, p - chlorophenacyl 6 - aminopenicillinate, phenacyl 6 - aminopenicillinate benzenesulphonic acid salt, p - bromophenacyl 6 - aminopenicillinate hydrochloride; tripropyltin 6 - aminopenicillinate and tributyltin 6-aminopenicillinate.

If the compounds of the general Formula I contain one or more asymmetric centres in the side chains, they may exist in different diastereoisomeric forms, which all are biologically active. It is to be understood that the present invention comprises the diastereoisomers as well as mixtures of them.

The following examples further illustrate the invention:

EXAMPLE 1

Preparation of 6-[D-α-(methoxyphenoxyphosphinyl-amino)-phenylacetamido]penicillanic acid To a stirred and ice-cooled suspension of 6-(D-α-aminophenylacetamido) penicillanic acid (85%, 6.2 g., 0.015 mole) in 50% dioxane (60 ml.) at pH 7 methoxyphenoxyphosphinyl chloride (3.1 g., 0.015 mole), in 5 ml. of dry dioxane was added dropwise during 45 min. The pH of the reaction mixture was kept constant by gradual addition of 2 N sodium hydroxide. The reaction mixture was filtered, washed with ethyl acetate, acidified to pH 3.5 and extracted with ethyl acetate. The organic extract was washed with water and after addition of water extracted with 2 N sodium hydroxide until the aqueous phase was neutral. The latter was freeze-dried to give 1.8 g. of the sodium salt of 6 - [D - α - (methoxyphenoxyphosphinyl-amino) - phenylacetamido]penicillanic acid with a purity of 93% (hydroxylamine assay).

The product was found to inhibit the growth of Staph. aureus, Oxford at a concentration of 1.25 mcg./ml. and to contain in its IR-spectrum a β-lactam absorption at 1.755 cm.$^{-1}$.

EXAMPLE 2

Preparation of 6-[D-α-(methoxyphenylphosphinyl amino)-phenylacetamido]penicillanic acid Phenylmethoxyphosphinyl chloride (2.9 g., 0.015 mole) dissolved in 10 ml. of dry dioxane was added dropwise to a stirred and ice-cooled suspension of 6 - (D - α - amino-phenylacetamido) penicillanic acid (5.2 g., 0.015 mole) kept at pH 8 by gradual addition of 2 N sodium hydroxide. After 90 min. the resulting almost clear solution was washed twice with ethyl acetate, acidified to pH 5.5 and extracted with its own volume of ethyl acetate. The aqueous phase was acidified further to pH 3.5 and extracted once more with ethyl acetate. The two organic extracts were each washed with water and after addition of water extracted with 2 N sodium hydroxide till the aqueous phases were neutral. The obtained aqueous solutions were freeze-dried.

From the pH 5.5-extract 1,2 g. of 6-[D-α-(methoxy-phenylphosphinylamino) - phenylacetamido]penicillanic acid with a purity of 94% (hydroxylamine assay) and from the pH 3.5-extract 3.3 g. with a purity of 87% were obtained.

The product in the pH 5.5-extract was found to inhibit the growth of Staph. aureus, Oxford at a concentration of 0.25 mcg./ml. and to contain in its IR-spectrum a strong absorption at 1760 cm.$^{-1}$, showing the presence of a β-lactam ring.

EXAMPLE 3

Preparation of 6-[D-α-(bisethoxyphosphinyl-amino)-phenylacetamido]penicillanic acid Diethyl chlorophosphate (3.5 g., 0.02 mole) dissolved in 10 ml. of dry dioxane, was added dropwise to a stirred and ice-cooled suspension of 6 - (D - α - aminophenylacetamido) penicillanic acid (7 g., 0.02 mole) in 100 ml. of 50% dioxane, kept at pH 8 by gradual addition to 2 N sodium hydroxide. After 45 min. the resulting clear solution was washed with ethyl acetate, acidified to pH 5.5 and extracted with its own volume of ethyl acetate. After acidification to pH 3.5 and 1.0 respectively the aqueous phase was extracted further, each time with its own volume of ethyl acetate. The three organic phases were each washed with water and after addition of water extracted with 2 N sodium hydroxide till the aqueous phases were neutral. The obtained aqueous solutions were freeze-dried to give the sodium salt of 6-[D-α-(bisethoxyphosphinyl-amino) - phenylacetamido]penicillanic acid. From the pH 5.5-extract 0.5 g. with a purity of 81% (hydroxylamine assay), from the pH 3.5-extract 6.7 g. with a purity of 86% and from the pH 1-extract 0.6 g. of the penicillin with a purity of 91% were obtained.

The product of the pH 3.5-extract was found to inhibit the growth of Staph. aureus, Oxford at a concentration of 0.63 mcg./ml. and to contain in its IR-spectrum a strong β-lactam absorption at 177° cm.$^{-1}$.

Using the method described in the example the following penicillins were prepared by reaction of the appropriate phosphinyl or phosphinothiolyl chlorides with 6-(D-α-aminophenylacetamido)penicillanic acid.

6-(D-α-dimethoxyphosphinothiolylamino-phenylacetamido)penicillanic acid.
6-(D-α-bis-2-chloroethoxyphosphinylamino-phenylacetamido)penicillanic acid.
6-(D-α-n-butoxy-ethoxyphosphinylamino-phenylacetamido)penicillanic acid.
6-(D-α-dibenzyloxyphosphinylamino-phenylacetamido)penicillanic acid.
6-(D-α-benzyloxyphenoxyphosphinylamino-phenylacetamido)penicillanic acid.
6-(D-α-4-chlorophenoxy-methoxyphosphinylamino-phenylacetamido)penicillanic acid.
6-(D-α-diphenoxyphosphinothiolylamino-phenylacetamido)penicillanic acid.
6-(D-α-ethoxy-3-methoxyphenoxyphosphinylamino-phenylacetamido)penicillanic acid.
6-(D-α-bis-4-tolyloxyphosphinylamino-phenylacetamido)penicillanic acid.
6-(D-α-di-α-naphthyloxyphosphinylamino-phenylacetamido)penicillanic acid.
6-(D-α-cyclohexyloxymethoxyphosphinylamino-phenylacetamido)penicillanic acid.
6-[D-α-(2-oxo-benzo-1,3,2-dioxaphospholinyl)amino-phenylacetamido]penicillanic acid.
6-[D-α-(2-thiono-1,3,2-dioxaphospholinyl)amino-phenylacetamido]penicillanic acid.

By reaction with α-amino-3-thenylpenicillin and α-amino-γ-methylbutyl-penicillin the α-benzyloxyethoxyphosphinylamino-3-thenyl penicillin and the α-diethoxyphosphinylamino-3-thenyl penicillin and the α-diethoxyphosphinylamino-γ-methylbutyl penicillin were prepared.

EXAMPLE 4

Preparation of 6-[D-α-(bisethoxyphosphinothiolyl amino)-phenylacetamido]penicillanic acid Diethyl chlorothiophosphate (3.8 g., 0.02 mole), dissolved in 10 ml. of dry dioxane, was added dropwise to a stirred and ice-cooled suspension of 6-(D-α-aminophenylacetamido)-penicillanic acid (7 g., 0.02 mole) in 100 ml. of 50% dioxane, kept at pH 8 by addition of 2 N sodium hydroxide. After 45 min. the resulting clear solution was washed with ether, acidified to pH 5.5 and extracted with ethyl acetate. The aqueous phase was acidified further to pH 3.5 and extracted with ethyl acetate again and finally after acidification to pH 1 the aqueous phase was extracted a third time with ethyl acetate. The three organic extracts were each washed with water and after addition of water extracted with 2 N sodium hydroxide till the aqueous phases were neutral. The obtained aqueous solutions were freeze-dried.

From the pH 5.5-extract 4.7 g. of the sodium salt of 6 - [O-α-(bisethoxyphosphinothiolylamino) - phenylacetamido]penicillanic acid with a purity of 91% (hydroxylamine assay) were obtained.

Further crops of the penicillin were obtained from the pH 5.5-extract (0.5 g., 81% pure) and from the pH 1-extract (0.3 g., 70% pure). The product in the pH 5.5 extract was found to inhibit the growth of *Staph. aureus*, Oxford at a concentration of 0.13 mcg./ml. and to contain in its IR-spectrum a strong absorption at 1770 cm.$^{-1}$ characteristic for the β-lactam ring of penicillins.

EXAMPLE 5

Preparation of 6-[D-α-(benzyloxyphenylphosphinyl-amino)-phenylacetamido]penicillanic acid Benzyloxyphenylphosphinyl chloride (7.4 g., 0.028 mole), dissolved in 10 ml. of dry dioxane, was added dropwise to a stirred and ice-cooled suspension of 6-(D-α-amino-phenylacetamido) penicillanic acid (9.6 g., 0.028 mole) in 150 ml. of 50% dioxane, kept at pH 8 by addition of 2 N sodium hydroxide. After 45 min. the reaction mixture was washed with ether, acidified to pH 5.5 and extracted with ethyl acetate. The aqueous phase was acidified to pH 3.5 and extracted a second time with ethyl acetate. The organic extracts were each washed with water and after addition of water extracted with 2 N sodium hydroxide till the aqueous phases were neutral. Freeze-drying of the aqueous solutions gave, from the pH 5.5-extract 2.3 g. of the pure sodium salt of 6-[D-α-(benzyloxyphenylphosphinylamino) - phenylacetamido]penicillanic acid and from the pH 3.5-extract 5.5 g. with a purity of 90% (hydroxylamine assay).

The product from the pH 5.5-extract was found to inhibit the growth of *Staph. aureus*, Oxford at a concentration of 0.13 mcg./ml. and to contain in its IR-spectrum a strong absorption at 1770 cm.$^{-1}$, showing the presence of a β-lactam ring.

EXAMPLE 6

Preparation of 6-[D-α-(benzyloxymethoxyphosphinyl-amino)-phenylacetamido]penicillanic acid Benzyl methyl phosphonate (4 g., 0.022 mole) in 75 ml. of dry carbon tetrachloride was treated with sulphuryl chloride (3.1 g., 0.023 mole) for 90 min. at room temperature, while a stream of dry nitrogen was led through the solution. The reaction solution was concentrated to a small volume in vacuo, giving an oily residue of benzyloxy (methoxy)-phosphinyl chloride, which was added dropwise to a stirred and ice-cooled suspension of 6-(D-α-amino-phenylacetamido)-penicillanic acid (7.7 g., 0.022 mole) in 100 ml. of 50% dioxane, kept at pH 8 by addition of 2 N sodium hydroxide. The obtained reaction solution was washed twice with ethyl acetate, acidified to pH 3.5 and extracted with ethyl acetate. The organic extract was washed with water and, after addition of water, extracted with 2 N sodium hydroxide till the aqeuous phase was neutral. The obtained aqueous solution was freeze-dried to give 6.9 g. of the sodium salt of 6-[D-α-(benzyloxymethoxyphosphinylamino) - phenylacetamido] penicillanic acid with a purity of 94%.

The product was found to inhibit the growth of *Staph. aureus*, Oxford at a concentration of 0.13 mcg./ml. and to contain in its IR-spectrum a strong absorption at 1760 cm.$^{-1}$ indicating the presence of a β-lactam ring.

EXAMPLE 7

Preparation of 6-[D-α-(methoxyhydroxyphosphinyl-amino)-phenylacetamido]penicillanic acid (a) To a 10% Pd/C-catalyst (1 g.) suspended in 10 ml. of water and saturated with hydrogen a neutral solution of the sodium salt of 6-[D-α-(benzyloxymethoxyphosphinylamino)-phenylacetamido]-penicillanic acid (1 g.) in 15 ml. of water was added and the mixture was hydrogenated at ambient pressure and temperature. The uptake of hydrogen was rapid and ceased after that 33 ml. had been absorbed. The catalyst was filtered off and the filtrate which had a pH of 3 was neutralized with 2 N sodium hydroxide and was finally freeze-dried to give 0.8 g. of the disodium salt of 6-[D-α-(methoxyhydroxyphosphinylamino)-phenylacetamido]penicillanic acid with a purity of 69% (hydroxyamine assay).

The product was found to inhibit the growth of *Staph. aureus*, Oxford at a concentration of 2.5 mcg./ml. and to contain in its IR-spectrum a strong β-lactam absorption at 1755 cm.$^{-1}$.

(b) The sodium salt of 6-[D-α-(methoxyphenoxyphosphinylamino)-phenylacetamido]penicillanic acid (1.2 g.) was dissolved in 10 ml. of water. By addition of 2 N sodium hydroxide the pH of the solution was brought to 9 and kept there till the consumption of base had ceased. The clear solution was acidified to pH 6.5 and washed well with ether and was then freeze-dried to give 1.1 g. of the disodium salt of 6-[D-α-(methoxyhydroxyphosphinylamino)-phenylacetamido]penicillanic acid with a purity of 75% (hydroxylamine assay). The product was found to inhibit the growth of *Staph. aureus*, Oxford at a concentration of 2.5 mcg./ml. and to contain in its IR-spectrum a strong β-lactam absorption at 1755 cm.$^{-1}$.

(c) Methoxyphosphinyl dichloride (4.5 g., 0.03 mole) in dry dioxane (5 ml.) was added dropwise to a stirred and ice-cooled suspension of 6-[D-α-amino-phenylacetamido]penicillanic acid (85%, 8.2 g., 0.02 mole) in 50% dioxane at pH 8. The pH of the reaction mixture was kept constant by addition of 2 N sodium hydroxide. The resulting clear solution was adjusted to pH 7, washed with ether and treated with calcium chloride dihydrate (4.4 g.). Addition of isopropanol (100 ml.) gave a precipitate, which was filtered off. Addition of isopropanol (200 ml.) and acetone (200 ml.) to the filtrate gave a second precipitate, which was collected. Finally a third crop of material was obtained by addition of isopropanol (200 ml.) and acetone (100 ml.) to the filtrate from the second filtration. After drying the precipitates were weighed and analysed and found to contain the calcium salt of 6-[D-α-(methoxyhydroxyphosphinylamino) - phenylacetamido] penicillanic acid in the following amounts and purities (hydroxylamine assay):

|  | Grams | Percent |
|---|---|---|
| Precipitate 1 | 1.8 | Purity 8.8. |
| Precipitate 2 | 4.9 | Purity 68. |
| Precipitate 3 | 5.3 | Purity 57. |

Paper chromatography showed that minor amounts of 6-(D-α-amino-phenylacetamido) penicillanic acid were contained in the precipitates as impurity. Precipitate 2 was purified by fractional reprecipitation from water-acetone. 3.4 g. of the calcium salt of the penicillin with a purity of 87% were obtained.

The product was found to inhibit the growth of *Staph. aureus*, Oxford at a concentration of 1.25 mcg./ml. and to contain in its IR-spectrum a strong β-lactam absorption at 1760 cm.$^{-1}$. On paper chromatography it showed the same RJ-value as the products obtained in Examples 7(a) and (b).

(d) The sodium salt of hydroxymethoxyphosphinyl azide (1.9 g., 0.015 mole) was added to a solution of 6-[D - α - aminophenylacetamido]penicillanic acid (85%, 4.1 g., 0.001 mole) in 50% dioxane (100 ml.) at pH 8.5. The reaction mixture was left overnight while the pH was kept constant by automatical addition of 2 N sodium hydroxide. The pH was adjusted to 7 and washed with ether. The aqueous phase was freeze-dried to give 5.8 g. of material which was analyzed as 71% as the disodium salt of 6 - [D - α - (hydroxymethoxyphosphinylamino)-phenylacetamido]penicillanic acid. Paper chromtography and IR-spectrum showed that the product contained in addition to the penicillin unreacted starting materials.

The sodium salt of hydroxymethoxyphosphinyl azide was prepared according to N. K. Hamer, Chem. Commun. 1967, 758.

EXAMPLE 8

Preparation of 6-[D-α-(hydroxyphenylphosphinylamino)-phenylacetamido]penicillanic acid (a) The sodium salt of 6-[D-α-(benzyloxyphenylphosphinylamino) - phenylacetamido]penicillanic acid (1 g.) was dissolved in 10 ml. of water and added to a suspension of a 10% PdC-catalyst, saturated with hydrogen at room temperature and pressure. The mixture was hydrogenated under ambient conditions. After 25 min. the absorption ceased after that 32 ml. of hydrogen had been taken up. The catalyst was removed by filtration and the acidic filtrate (pH 4.5) was neutralized by addition of 2 N sodium hydroxide and freeze-dried to give 0.7 g. of the disodium salt of 6-[D-α-(hydroxyphenylphosphinylamino)-phenylacetamido]penicillanic acid with a purity of 85% (hydroxylamine assay).

This product was found to inhibit the growth of *Staph. aureus*, Oxford at a concentration of 0.13 mcg./ml. and to contain in its IR-spectrum a strong band at 1760 cm.$^{-1}$, showing the presence of a β-lactam ring.

(b) Phenylphosphinyl dichloride (2.0 g., 0.01 mole) dissolved in 10 ml. of dry dioxane, was slowly added to a stirred and ice-cooled suspension of 6-(D-α-aminophenylacetamido)-penicillanic acid (3.5 g., 0.01 mole) in 50 ml. of 50% dioxane, kept at pH 8 by addition of 2 N sodium hydroxide. The resulting clear solution was washed with ethyl acetate, acidified to pH 3.5 and extracted with ethyl acetate. The aqueous phase was acidified further to pH 1 and extracted once more with ethyl acetate. The organic extracts were each washed with water and, after addition of water, extracted with 2 N sodium hydroxide till the aqueous phases were neutral. Freeze-drying of the aqueous solutions gave: From the pH 3.5 - extract 0.7 g. of the disodium salt of 6-[D-α - (hydroxyphenylphosphinylamino) - phenylacetamido] penicillanic acid with a purity of 57% (hydroxyl assay). From the pH 1-extract 0.9 g. of the penicillin with a purity of 34% was obtained. Paper chromatography showed that both products contained some 6-(D-α-aminophenylacetamido)-penicillanic acid.

The product from the pH 3.5-extract was found to inhibit the growth of *Staph. aureus*, Oxford at a concentration of 0.25 mcg./ml. and to contain in its IR-spectrum a strong β-lactam absorption at 1760 cm.$^{-1}$.

Using the method described in Example 8(b) the disodium salt of 6-[D-α-(ethylhydroxyphosphinylamino)-phenylacetamido]penicillanic acid was prepared from ethylphosphinyl dichloride and 6 - [D - α-amino-phenyl-acetamido]penicillanic acid.

The product (purity 46%) was found to inhibit the growth of *Staph. aureus*, Oxford at a concentration of 0.63 mcg./ml.

EXAMPLE 9

Preparation of 6-[D-α-(hydroxyphenoxyphosphinylamino)-phenylacetamido]penicillanic acid Phenoxyphosphinyl dichloride (4.2 g., 0.02 mole) dissolved in dry dioxane (10 ml.) was added dropwise to a stirred and ice-cooled suspension of 6-(D-α-aminophenylacetamido) penicillanic acid (85%, 8.2 g., 0.02 mole) in 50% dioxane (50 ml.), while the pH was kept constantly at 8 by addition of 2 N sodium hydroxide. The resulting clear solution was washed twice with ether and treated with calcium chloride dihydrate (3 g.). Isopropanol (300 ml.) was added giving a white precipitate, which was removed by filtration. Concentration of the filtrate to a volume of about 100 ml. and dilution with the same volume of isopropanol gave 4.3 g. of the calcium salt of 6 - [D - α - (hydroxyphenoxyphosphinylamino)-phenylacetamido]penicillanic acid.

The product was found to inhibit the growth of *Staph. aureus*, Oxford at a concentration of 1.25 mcg./ml.

On paper chromatography the product was found to contain a small amount of 6-(D-α-aminophenylacetamido) penicillanic acid.

EXAMPLE 10

Preparation of 6-[D-α-bishydroxyphosphinylamino-phenylacetamido]penicillanic acid The sodium salt of 6-(D-α-bisbenzyloxyphosphinyl-amino-phenylacetamido) penicillanic acid (2 g.) was dissolved in water (100 ml.), palladium on carbon catalyst (5%, 1 g.) was added and hydrogen was rapidly led through the well stirred mixture. The pH of it was held constantly at 7 by addition of 2 N sodium hydroxide. After 30 min. the consumption of base ceased and the catalyst was removed by filtration and filtrate was freeze-dried to give 1.3 g. of the disodium salt of 6-(D-α-bis-hydroxyphosphinylamino - phenylacetamido) penicillanic acid with a purity of 90% (hydroxylamine assay).

The product was found to inhibit the growth of *Staph. aureus*, Oxford at a concentration of 0.63 mcg./ml. and to contain in its IR-spectrum a strong band at 1750 cm.$^{-1}$ showing the presence of a β-lactam ring.

EXAMPLE 11

Preparation of 6-[D-α-(ethylmethoxyphosphinylamino) phenyl-acetamido] penicillanic acid Ethylmethoxyphosphinyl chloride (2.3 g., 0.016 mole) dissolved in dry ether (5 ml.) was added dropwise to a stirred and ice-cooled suspension of 6-(D-α-amino-phenyl acetamido) penicillanic acid (85%, 6.6 g., 0.016 mole) in 75% acetone at pH 7. The pH of the reaction mixture was kept constant by addition of 2 N sodium hydroxide. After 90 min. the consumption of base ceased and the reaction mixture was filtered, washed with ether, acidified to pH 3.5 and extracted with butylacetate. The organic phase was washed with water and after addition of water extracted with 2 N sodium hydroxide until the aqueous phase was neutral. Freeze-drying of the latter gave the sodium salt of 6-[D-α-(ethylmethoxyphosphinylamino)-phenylacetamido] penicillanic acid (1.4 g.) with a purity of 58% (hydroxylamine assay).

The compound was found to inhibit the growth of *Staph. aureus*, Oxford at a concentration of 1.25 mcg./ml. and to contain in its IR-spectrum a β-lactam absorption at 1760 cm.$^{-1}$.

The ethylmethoxyphosphinyl chloride (Calcd. for $C_3H_2ClO_2P$ (percent): Cl, 24.9. Found (percent): Cl, 25.1) was prepared by treatment at icebath temperature of ethylphosphinyl dichloride, dissolved in ether, with an equimolar mixture of dry methanol and pyridine in ether. The formed pyridine hydrochloride was removed by filtration and the solvent removed in vacuo.

In the manner described above the 6-[D-α-(benzyloxyethylphosphinylamino)-phenylacetamido] penicillanic acid was also prepared.

EXAMPLE 12

Preparation of 6-[D-α-(methoxyphenylphosphinothiolyl-amino)-phenylacetamido] penicillanic acid A stirred and ice-cooled suspension of 6-(D-α-amino-phenylacetamido) penicillanic acid (85%, 8.2 g., 0.02 mole) in 50% dioxane (100 ml.) was treated at pH 8 dropwise with an equivalent amount of methoxyphenyl-phosphinothiolyl chloride dissolved in dry dioxane. The pH of the reaction mixture was kept constant by addition of 2 N sodium hydroxide. After 2 hours the obtained clear solution was washed with ether, acidified to pH 3.5 and extracted with butyl acetate. The aqueous phase was acidified further to pH 2 and extracted again with butyl acetate. The organic phases were separatedly washed with water and after addition of water extracted with 2 N sodium hydroxide until the aqueous phases were neutral. Freeze-drying of the latter gave the sodium salt of 6-[D-α - (methoxyphenylphosphinothiolylamino) - phenylacetamido]-penicillanic acid. From the pH 3.5-extract 7.5 g. of the penicillin with a purity of 78% (hydroxylamine assay) and from the pH 2-extract 0.5 g. of the penicillin with a purity of 32% were obtained.

The main product was found to inhibit the growth of *Staph. aureus*, Oxford at a concentration of 0.25 mcg./ml. and to contain in its IR-spectrum a strong β-lactam absorption at 1760 cm.$^{-1}$.

The methoxyphenylphosphinothiolyl chloride was prepared by treatment of phenylphosphinothiolyl dichloride (4.4 g., 0.02 mole) in dry benzene (25 ml.) at 35–40° C. with a mixture of methanol (0.64 g., 0.02 mole) and triethylamine (2 g., 0.02 mole) in dry benzene (5 ml). After stirring for 2 hours at room temperature the triethylamine hydrochloride formed was removed by filtration and the filtrate concentrated in vacuo. The residue was used for the synthesis directly.

Using the method described in this example the sodium salt of 6 - [D-α-(ethoxyethylthiophosphinylamino)-phenylacetamido]-penicillanic acid was also prepared by treatment of 6 - (D-α-amino-phenylacetamido) penicillanic acid with ethoxyethylthiophosphinyl chloride.

The product, purity 63%, was found to inhibit the growth of *Staph. aureus*, Oxford at a concentration of 0.63 mcg./ml.

EXAMPLE 13

6-[D-α-(benzyloxyphenylphosphinothiolylamino)-phenyl-acetamido]-penicillanic acid In the manner described in Example 12 the sodium salt of 6 - [D-α-(benzyloxyphenylphosphinothiolylamino)phenylacetamido]-penicillanic acid was prepared from benzyloxyphenylphosphinothiolyl chloride and 6-(D-α-aminophenylacetamido) penicillanic acid.

The product (purity 80%) was found to inhibit the growth of *Staph. aureus*, Oxford at a concentration of 0.25 mcg./ml. and to contain in its IR-spectrum a β-lactam absorption at 1755 cm.$^{-1}$

EXAMPLE 14

Preparation of bisethoxyphosphinylamino-methylpenicillin

Bisethoxyphosphinylaminoacetic acid (2.1 g., 0.01 mole) and triethylamine (1 g., 0.01 mole) in dry dimethylformamide (50 ml.) were treated, while stirring at −10 to −15° C., dropwise with ethyl chloroformate (1.1 g., 0.01 mole), dissolved in dry ether (5 ml.), 10 min. after that all of the chloroformate had been added an ice-cooled solution of 6-aminopenicillanic acid (3.2 g., 0.015 mole) and triethylamine (1.6 g., 0.016 mole) in water (30 ml.) was added all at once and stirring was continued for 90 min. without cooling. The reaction mixture was washed with ether, acidified to pH 2 and extracted with ether. The organic phase was washed with water and after addition of water extracted with 2 N sodium hydroxide until the aqueous phase as neutral. Freeze-drying of the latter gave 1.6 g. of the sodium salt of bisethoxyphosphinylamino-methylpenicillin with a purity of 54%.

The product was found to inhibit the growth of *Staph. aureus*, Oxford, at a concentration of 2.5 mcg./ml. and to contain a strong absorption in its IR-spectrum at 1760 cm.$^{-1}$.

The bisethoxyphinylaminoacetic acid used as starting material was prepared according to P. I. Alimov and O. N. Fedorova. Izv. Akad. Nauk. SSSR. Ser. Khim. 1966, 1370 (C.A. 66 (1967), 65818e.)

In the same way the following penicillins were prepared from the appropriately substituted amino acids and 6-aminopenicillanic acid.

α-(Bis-ethoxyphosphinylamino) - β - phenylethylpenicillin, bis - benzyloxyphosphinylamino - methylpenicillin, bis - methoxyphosphinothiolylamino - methylpenicillin, α - (bis - methoxyphosphinylamino) - γ - thiomethyl-propylpenicillin.

EXAMPLE 15

Preparation of 6-[D-α-(bis-p-tolyloxyphosphinylamino)-phenylacetamido]penicillanic acid Bis-p-tolyloxyphosphinyl chloride (6 g., 0.02 mole) dissolved in dry dioxane (5 ml.) was added dropwise to a stirred and ice-cooled suspension of 6-(D-α-amino-phenyl-acetamido)penicillanic acid. (85%, 8.2 g., 0.02 mole) in 50% dioxane (50 ml.). The pH of the reaction mixture was kept at 7 by addition of 2 N sodium hydroxide. After the consumption of base ceased the reaction mixture was washed with ether acidified to pH 3.5 and extracted with butyl acetate. The aqueous phase was further acidified to pH 2 and extracted again with butyl acetate. The organic extracts were separately washed with water and after addition of water extracted with 2 N sodium hydroxide until the aqueous phases were neutral. Freeze-drying of these gave from the pH 3.5 extract 4.3 g. of the sodium salt of 6-[D-α-(bis-p-tolyloxyphosphinyl-amino)phenylacetamido]penicillanic acid with a purity of 66% and from the pH 2 extract 2.5 g. with a purity of 37%.

The product of the main fraction was found to inhibit the growth of *Staph. aureus*, Oxford at a concentration of 0.25 mcg./ml. and to contain in its IR-spectrum a strong absorption at 1760 cm.$^{-1}$ indicating a β-lactam ring.

We claim:

1. A compound having the formula:

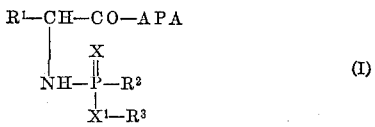

and non-toxic salts thereof, wherein APA is the residue

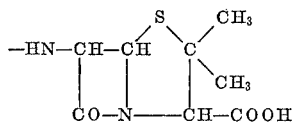

$R^1$ is selected from the class consisting of hydrogen, alkyl of at most 5 carbon atoms, benzyl, tolyl, phenyl, naphthyl and monocyclic aryl groups in which the ring consists of carbon and sulfur, and $R^2$ is $R^4$ or $OR^4$, wherein $R^4$ is selected from the group consisting of hydrogen, alkyl of at most 5 carbon atoms, benzyl, tolyl, phenyl and naphthyl, $R^3$ is selected from the class consisting of hydrogen, alkyl of at most 5 carbon atoms, benzyl, tolyl, phenyl and naphthyl, which substituents $R^1$, $R^3$ and $R^4$ all may be unsubstituted or substituted with at least one member of the class consisting of alkyl of at most 3 carbon atoms, alkoxy of at most 3 carbon atoms, nitro, halogen and methylmercapto; X is selected from O and S, and $X^1$ is O.

2. A compound as set forth in claim 1, wherein $R^1$ is unsubstituted phenyl.

3. A compound as set forth in claim 1, wherein $R^1$ is unsubstituted thienyl.

4. A compound as set forth in claim 1, wherein $R^1$ is alkyl of at most 5 carbon atoms.

5. A compound as set forth in claim 1, wherein $R^4$ is alkyl of at most 5 carbon atoms.

6. A compound as set forth in claim 1, wherein $R^4$ is unsubstituted phenyl.

7. A compound as set forth in claim 1, wherein $R^3$ is hydrogen.

8. A compound as set forth in claim 1, wherein $R^3$ is alkyl of at most 5 carbon atoms.

9. 6-[D-α - (hydroxymethoxyphosphinylamino)phenylacetamido]-penicillanic acid and non-toxic salts thereof.

10. 6-[D-α - (hydroxyphenylphosphinylamino)phenylacetamido]-penicillanic acid and non-toxic salts thereof.

11. 6-[D-α - (bishydroxyphosphinylamino)phenylacetamido]-penicillanic acid and non-toxic salts thereof.

12. 6-[D-α - (methoxyphenylphosphinothiolylamino)-phenylacetamido] - penicillanic acid and non-toxic salts thereof.

13. 6 - [D-α-(hydroxyphenoxyphosphinylamino)-phenylacetamido]-penicillanic acid and non-toxic salts thereof.

References Cited

UNITED STATES PATENTS

| | | | |
|---|---|---|---|
| 3,144,444 | 8/1964 | Koe | 260—239.1 |
| 3,352,850 | 11/1967 | Doyle et al. | 260—239.1 |

NICHOLAS S. RIZZO, Primary Examiner

U.S. Cl. X.R.

260—999

PO-1050
(5/69)

UNITED STATES PATENT OFFICE
CERTIFICATE OF CORRECTION

Patent No. 3,558,601                    Dated January 26, 1971

Inventor(s) Bertil Åke Ekstrom and Berndt Olof Harald Sjoberg

It is certified that error appears in the above-identified patent and that said Letters Patent are hereby corrected as shown below:

Column 3, line 14, bracketed formula reads "NH-P-$R^1$", should read -- NH-P-$R^2$ --;

Column 3, line 6, "axido" should read -- azido --;

Column 6, line 73, "177°" should read -- 1770 --;

Column 7, line 32, delete -- α-diethoxyphosphinylamino-3-thenyl penicillin and the --;

Column 7, line 54, "[0-α" should read -- [D-α --;

Column 11, line 25, "$C_3H_2ClO_2P$" should read -- $C_3H_8ClO_2P$ --;

Column 12, line 35, "as" should read -- was --;

Column 12, line 42, "bisethoxyphinylaminoacetic" should read -- bisethoxyphosphinylaminoacetic --.

In the heading to the printed specification, line 3, the second inventor's name should read -- Berndt Olof Harold Sjoberg --.

Signed and sealed this 14th day of September 1971.

(SEAL)
Attest:

EDWARD M. FLETCHER, JR.          ROBERT GOTTSCHALK
Attesting Officer                Acting Commissioner of Paten